United States Patent Office 3,763,256
Patented Oct. 2, 1973

3,763,256
DIMERIZATION OF STYRENE COMPOUNDS
Stephen N. Massie, Palatine, Ill., assignor to Universal
Oil Products Company, Des Plaines, Ill.
No Drawing. Filed June 7, 1972, Ser. No. 263,362
Int. Cl. C07c 3/20
U.S. Cl. 260—668 C                                10 Claims

ABSTRACT OF THE DISCLOSURE

Styrene compounds are dimerized by treating said compounds in the presence of a catalyst comprising a molybdenum-containing compound at dimerization conditions.

---

This invention relates to a process for the dimerization of styrene compounds, and particularly to a process whereby a styrene compound of a type hereinafter set forth in greater detail is dimerized in the presence of certain catalysts comprising a molybdenum-containing compound.

Synthetic materials and particularly plastics will find a wide variety of use in modern day living. A particular type of plastic comprises polyolefin compositions such as polyethylene, polypropylene, copolymers and terpolymers thereof. Each individual plastic has its own characteristics and is adaptable for particular uses which require these characteristics. However, it is necessary in some instances to modify or alter the characteristics of certain polyolefin compositions in order to render the thus modified compositions useful in some other way. In this respect it is known that certain compounds such as styrene dimers will impart desirable impact-resistance to polyolefin compositions such as the aforesaid polyethylene or polypropylene.

It is therefore an object of this invention to provide a process for preparing dimers of styrene compounds.

A further object of this invention is to provide a process for the dimerization of a styrene compound using certain catalytic compositions of matter to effect the dimerization.

In one aspect an embodiment of this invention resides in a process for the dimerization of a styrene compound which comprises treating said compound in the presence of a catalyst comprising a molybdenum-containing compound at dimerization conditions, and recovering the resultant dimer.

A specific embodiment of this invention is found in a process for the dimerization of styrene which comprises treating said styrene in the presence of a catalyst comprising molybdenum (VI) oxalate at a temperature in the range of from ambient to about 200° C. and a pressure in the range of from atmospheric to about 100 atmospheres and recovering the resultant 1,3-diphenyl-1-butene.

Other objects and embodiments will be found in the following further detailed description of the present invention.

As hereinbefore set forth the present invention is concerned with a process for the dimerization of styrene compounds by treating said compounds in the presence of a catalyst comprising a molybdenum-containing compound, said treatment being effected at dimerization conditions. These dimerization conditions will include temperatures in the range of from ambient (about 20° to 25° C.) up to about 200° C. or more and at pressures ranging from atmospheric to about 100 atmospheres or more. The superatmospheric pressures which may be employed in effecting the reaction are afforded by the introduction of a substantially inert gas such as nitrogen into the reaction zone, the amount of pressure which is utilized being that which is sufficient to maintain a major portion of the reactants in a liquid phase. The dimerization reaction is effected during a time period which may range from about 0.5 up to about 40 hours or more in duration, the residence time being determined by the other reaction condition parameters, especially temperature.

Examples of styrene compounds which may undergo dimerization according to the process of the present invention will include styrene, α-methylstyrene, 1-phenyl-1-propene (β-methylstyrene), as well as styrene compounds containing a substituent on the aromatic ring such as o-methylstyrene, m-methylstyrene, p-methylstyrene, o-ethylstyrene, m-ethylstyrene, p-ethylstyrene, o-propylstyrene, m-propylstyrene, p-propylstyrene, etc. It is to be understood that the aforementioned styrene compounds are only representative of the class of compounds which may be subjected to dimerization according to the process herein described and that the present invention is not necessarily limited thereto.

The catalysts which are employed to effect the process of this invention will comprise a molybdenum-containing compound such as ammonium molybdate, barium molybdate, cadmium molybdate, calcium molybdate, copper molybdate, lead molybdate, lithium molybdate, magnesium molybdate, manganese molybdate, nickel molybdate, potassium molybdate, sodium molybdate, strontium molybdate, zinc molybdate, zirconium molybdate, molybdenum trioxide, etc.; complexes of molybdenum compounds with polybasic organic acids and polyhydroxyl compounds as well as complexes of molybdenum and β-diketones such as molybdenum (VI) oxalate, molybdenum (VI) lactate, molybdenum (VI) malate, molybdenum (VI) tartrate, molybdenum (VI) citrate, molybdenum (VI) citramalate, molybdenum (VI) isocitrate, molybdenum (VI) muscate, molybdenum (VI) salicylate, molybdenum (0) hexacarbonyl, molybdenyl acetylacetonate, etc. It is to be understood, that, as in the case of the styrene compounds, the above recitation of molybdenum-containing catalysts is only representative of the type of molybdenum-containing compounds which may be employed, and that the present invention is not necessarily limited thereto.

It is also contemplated within the scope of this invention that the reaction may be advantageously conducted in the presence of a weak proton source such as carboxylic acids including acetic acid, propionic acid, butyric acid, valeric acid, etc.; lower molecular weight alcohols such as methyl alcohol, ethyl alcohol, n-propyl alcohol, isopropyl alcohol, n-butyl alcohol, t-butyl alcohol, etc.; or water.

The process of the present invention may be effected in any suitable manner and may comprise either a batch or continuous type operation. For example, when a batch type operation is used, the styrene compound along with a catalytic amount of a compound containing molybdenum and, if so desired, the weak proton source is placed in an appropriate apparatus. In the event that pressures above atmospheric are to be employed, the reactor will comprise an autoclave of the rotating or mixing type or other pressure-resistant vessels. The vessel is then pressured to the desired operating level and thereafter heated to a predetermined operating temperature for a residence time within the durations hereinbefore set forth. Alternatively if atmospheric pressures are to be employed, an open vessel may be utilized. Upon completion of the desired residence time, heating is discontinued, and the reactor is allowed to return to room temperature. Any excess pressure if present is discharged, the reactor is opened, and the reaction mixture is recovered therefrom. After separation from the catalyst the liquid mixture is subjected to conventional means of purification such as washing, drying, distillation, crystallization, etc. whereby the desired dimer is separated from unreacted starting material and/or unwanted side products which may have formed and recovered.

It is also contemplated within the scope of this invention that the dimerization process may be effected in a continuous manner. When such a type of operation is used a reactor containing the catalyst comprising a molybdenum-containing compound is maintained at the proper operating conditions of temperature and pressure. The styrene compound charge stock and the weak proton source such as acetic acid, methyl alcohol, water, etc. are continuously charged to the reactor through separate lines or, if so desired, they may be admixed prior to entry into said reactor and charged thereto in a single stream. Upon completion of the desired residence time, the reactor effluent is continuously withdrawn and subjected to conventional means of separation of the type hereinbefore set forth whereby the desired dimer is recovered and passed to storage, while any unreacted starting materials may be recycled to form a portion of the feed stock.

When the catalyst is in solid form, various types of continuous manners of operation may be employed. One such type is the fixed bed type of operation in which the catalyst is maintained as a fixed bed in the reactor and the styrene compound is passed therethrough in either an upward or downward flow. Another type of operation is the moving bed operation in which the catalyst and the styrene compound are passed through the reactor either concurrently or countercurrently to each other, or the slurry type in which the catalyst is carried into the reactor as a slurry in the starting material.

Examples of dimers of styrene compounds which may be prepared according to the process of this invention will include 1,3-di-o-tolyl)-1-butene,
2,4-diphenyl-4-methyl-2-pentene,
1,3-diphenyl-2-methyl-1-pentene,
1,3-di-(o-tolyl)-1butene,
1,3-di-(m-tolyl)-1-butene,
1,3-di-(p-tolyl)-1-butene,
1,3-di-(o-ethylphenyl)-1-butene,
1,3-di-(m-ethylphenyl)-1-butene,
1,3-di-(p-ethylphenyl)-1-butene,
1,3-di-(o-propylphenyl)-1-butene,
1,3-di-(m-propylphenyl)-1-butene,
1,3-di-(p-propylphenyl)-1-butene, etc.

It is to be understood that the aforementioned dimers are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 28.1 g. (0.27 mole) of styrene, 60.0 g. (1.0 mole) of acetic acid along with 1.0 g. of molybdenum (VI) oxalate were added to the glass liner of a rotating autoclave having a capacity of 850 cc. The liner was sealed into the autoclave, flushed with nitrogen and pressured to 35 atmospheres with nitrogen. Following this the autoclave and contents thereof were heated to a temperature of 140° C. for a period of 16 hours, the autoclave being continually rotated during the 16-hour period. At the end of the 16-hour period, heating was discontinued and the autoclave allowed to return to room temperature. The excess pressure was discharged, the autoclave was opened and the liner containing a dark blue solution was removed from the autoclave. The product mixture was transferred to a separatory funnel, diluted with ether and washed 3 times with 250 ml. of water. The clear yellow organic phase which separated from the aqueous phase was then stirred with a sodium bicarbonate solution until the evolution of gas ceased, at which time the layers were again separated. The organic layer was washed with saturated brine and dried by treatment with anhydrous potassium carbonate and anhydrous sodium sulfate. The remaining ether was evaporated to yield an amber oil which was subsequently fractionated on a spinning band distillation column. The first cut having a boiling point in the range of from 96° to 108.5° C. at 0.46 mm. pressure was recovered as well as a second cut having a boiling point in the range of 108.5° to 109° C. at 0.46 mm. pressure. The cuts were subjected to infrared and nuclear magnetic resonance analyses. These analyses determined that the first cut contained 77%, and the second cut contained 100%, of the styrene dimer, trans-1,3-diphenyl-1-butene.

EXAMPLE II

In this example 26.0 g. of styrene, 78.0 g. of benzene and 1.0 g. of molybdenum (O) hexacarbonyl were placed in the glass liner of a rotating autoclave. The liner was sealed into the autoclave, flushed with nitrogen and pressured to 35 atmospheres with an additional amount of nitrogen. Thereafter the autoclave was heated to a temperature of 140° C. and maintained thereat for a period of 16 hours. At the end of the 16-hour period, heating was discontinued, the autoclave was allowed to return to room temperature and the excess pressure was discharged. After opening the autoclave, the liquid product was recovered and subjected to treatment in a manner similar to that set forth in Example I above. The desired product comprising trans-1,3-diphenyl-1-butene was verified by gas chromatographic analysis utilizing the compound obtained in Example I as standard.

EXAMPLE III

To the glass liner of a rotating autoclave is added 38.4 g. (0.3 mole) of α-methylstyrene, 60 g. (1.0 mole) of acetic acid and 1.0 g. of molybdenyl acetylacetonate. The liner is sealed into the autoclave, flushed with nitrogen and thereafter pressured to 35 atmospheres with nitrogen. The autoclave is then heated to a temperature of 120° C. and maintained thereat for a period of 16 hours, the autoclave being continually rotated during the reaction period. At the end of the 16 hours, heating is discontinued, the autoclave is allowed to return to room temperature and the excess pressure is discharged therefrom. The autoclave is opened, the reaction mixture is recovered and transferred to a separatory funnel. This product mixture is then diluted with ether and washed with water following which the organic phase is stirred with sodium bicarbonate solution until the evolution of gas ceases. After separation of the organic layer from the aqueous layer, the former is washed with saturated brine, dried by treatment with anhydrous potassium carbonate and anhydrous sodium sulfate and the remaining ether is evaporated. The product is then subjected to fractional distillation on a spinning band distillation column under reduced pressure. The analysis of the first and second cuts by means of infra-red and nuclear magnetic resonance will determine the presence of the desired product which comprises 2,4-diphenyl-4-methyl-2-pentene.

EXAMPLE IV

In like manner a mixture of 38.4 g. of 1-phenyl-1-propene, 60 g. of methyl alcohol and 1 g. of molylbdenum (VI) oxalate is treated by being placed in an autoclave which is pressured to 35 atmospheres with nitrogen and heated to a temperature of 140° C. for a period of 16 hours. At the end of the reaction period, the product is recovered and treated in a manner similar to that set forth in Example I above. The desired cuts comprising 1,3-diphenyl-2-methyl-1-pentene are recovered, the presence of this compound being verified by means of infrared and nuclear magnetic resonance analysis.

EXAMPLE V

To the glass liner of a rotating autoclave is charged 38.4 g. (0.3 mole) of p-methylstyrene, 60 g. of acetic acid and 1 g. of molybdenum (VI) oxalate. The autoclave is flushed with nitrogen and thereafter pressured to 35 atmospheres with an additional amount of nitrogen. Thereafter the autoclave is heated to a temperature of 150° C. and maintained thereat for a period of 10 hours, the autoclave being subjected to continual rotation during this period. At the end of this time, heating is discontinued, the autoclave is allowed to return to room temperature and the excess pressure which remains is discharged therefrom. The reaction product is recovered and treated in a manner similar to that set forth in the above examples. Fractional distillation under reduced pressure of the purified product will result in the obtention of the desired product comprising 1,3-di-(p-tolyl)-1-butene, the presence of this compound being verified by means of infrared and nuclear magnetic resonance analyses.

EXAMPLE VI

To illustrate the operability of the process of the present invention at a relatively low temperature, another experiment was performed in which 28.1 g. (0.27 mole) of styrene, 60 g. (1.0 mole) of acetic acid and 1.0 g. of a catalyst comprising molybdenum (VI) oxalate were placed in a magnetically stirred glass reaction flask. The flask was stirred for a period of 36 hours, the temperature being maintained at 35° C. during this period. During this 36-hour period, the progress of the experiment was monitored by a gas chromatograph. At the end of the 36-hour period, the flask was allowed to return to room temperature and the reaction mixture was recovered. After separation from the catalyst, analysis of the liquid disclosed the presence of the desired compound comprising the dimer of styrene, namely, trans-1,3-diphenyl-1-butene.

I claim as my invention:

1. A process for the dimerization of a styrene compound which comprises treating said compound in the presence of a catalyst consisting essentially of a molybdenum-containing compound at dimerization conditions, and recovering the resultant dimer.

2. The process as set forth in claim 1 in which said dimerization conditions includes a temperature in the range of from about ambient to about 200° C. and at pressures in the range of from about atmospheric to about 100 atmospheres.

3. The process as set forth in claim 1 in which said molybdenum-containing compound is molybdenum (VI) oxalate.

4. The process as set forth in claim 1 in which said molybdenum-containing compound is molybdenyl acetylacetonate.

5. The process as set forth in claim 1 further characterized in that said dimerization is effected in the presence of acetic acid.

6. The process as set forth in claim 1 further characterized in that said dimerization is effected in the presence of methyl alcohol.

7. The process as set forth in claim 1 in which said styrene compound is styrene and said dimer is 1,3-diphenyl-1-butene.

8. The process as set forth in claim 1 in which said styrene compound is α-methylstyrene and said dimer is 2,4-diphenyl-4-methyl-2-pentene.

9. The process as set forth in claim 1 in which said styrene compound is 1-phenyl-1-propene and said dimer is 1,3-diphenyl-2-methyl-1-pentene.

10. The process as set forth in claim 1 in which said styrene compound is p-methylstyrene and said dimer is 1,3-di-(p-tolyl)-1-butene.

References Cited
FOREIGN PATENTS 191,511    4/1967    U.S.S.R. ---------- 260—669 P CURTIS R. DAVIS, Primary Examiner U.S. Cl. X.R.

260—668 R, 669 P